INVENTOR.
EDMUND C. SWISHER
BY
ATTORNEYS.

UNITED STATES PATENT OFFICE.

EDMUND C. SWISHER, OF LOS ANGELES, CALIFORNIA.

OIL-BURNER.

1,293,241.   Specification of Letters Patent.   Patented Feb. 4, 1919.

Application filed August 29, 1918. Serial No. 251,969.

*To all whom it may concern:*

Be it known that I, EDMUND C. SWISHER, a citizen of the United States, residing at Los Angeles, in the county of Los Angeles and State of California, have invented new and useful Improvements in Oil-Burners, of which the following is a specification.

My invention relates to oil burners and especially to oil burners for domestic use as in cook stoves, heating stoves, and the like, and my invention consists in the novel features herein shown, described and claimed.

Figures 1, 2:
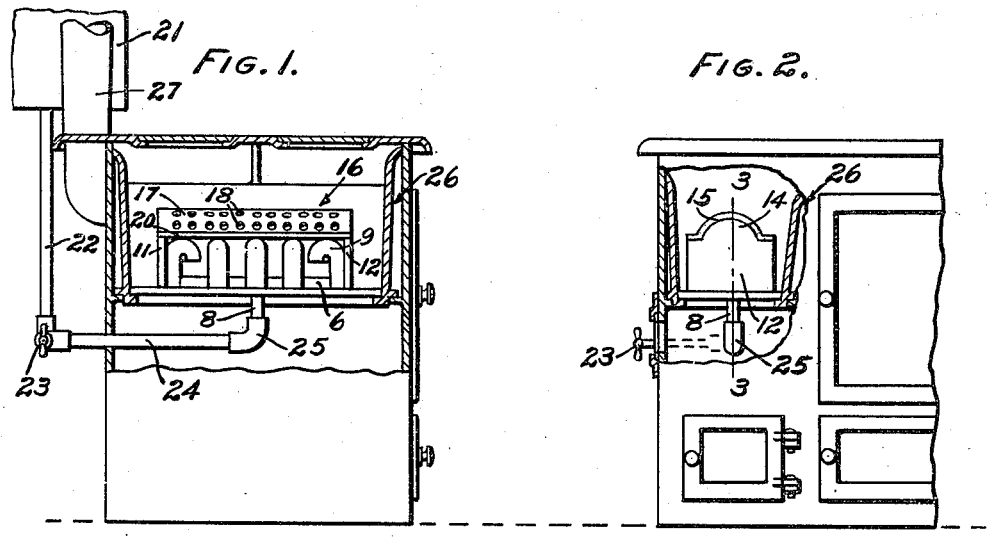
Figure 1 shows a cook stove in sectional elevation and an oil burner embodying the principles of my invention in position for use in the cook stove, and shown in side elevation.
Fig. 2 shows the cook stove in section and the oil burner in end elevation.

The details of the cook stove burner shown in Figs. 1 to 4 are as follows:

The base 1 is rectangular in plan and has grooves 2 and 3 extending along its upper face near the side edges, and a series of grooves 4 and 5 extending along its upper face near its end edges, so that the base may be broken off along the grooves to make the base fit the stove. Walls 6 extend upwardly from the upper face of the base 1 some distance inside of the ends, and some distance inside of the sides to form a rectangular vaporizing pan 7. The oil feed pipe 8 is tapped through the base 1 at the center of the vaporizing pan 7. Return bends 9 extend upwardly from the base 1 over the walls 6, said return bends being evenly spaced all the way around the vaporizing pan 7, so that the return bend passages 10 lead upwardly through the base 1, inwardly over the walls 6, and discharge downwardly into the pan 7. End walls 11 and 12 extend upwardly from the base 1 across the ends and to the height of the return bends 9, and extension end walls or gables 13 and 14 extend upwardly from the end walls 11 and 12, and have circular upper edges 15. The foraminous baffle plate 16 consists of the curved portion 17 fitting the gables 13 and 14, and having perforations 18 and the flat rim portions 19 and 20 along the sides of the curved portion 17. The foraminous baffle plate 16 is straight longitudinally, and the portion 17 is curved transversely, and the gables 13 and 14 engaging the curved portion serve to hold the baffle plate from moving sidewise. The oil supply tank 21 is mounted at an elevation high enough, so that the oil will run into the burner, and the pipe 22 leads downwardly from the tank 21. A regulating valve 23 is incorporated into the pipe 22 and the pipe section 24 leads from the valve 23 through the wall of the stove under the burner to the elbow 25, and the elbow 25 is screwed upon the pipe 8, so that when the valve 23 is opened the oil will run upwardly through the pipe 8 and spread upon the base 1 within the wall 6.

The burner thus constructed is mounted in the fire box of a cook stove, as shown in Figs. 1 and 2, with the foraminous baffle plate 16 some distance below the top of the stove. The fire box 26 should be made to fit substantially air tight with the edges of the base 1 all the way around, so that the draft of the stove will take fresh air through the return bend passages 10 and discharge the fresh air downwardly into the vaporizing pan 7. When the oil is ignited in the vaporizing pan 7 and the draft put into operation by opening the damper in the stove pipe 27 the oil will burn and the flame will pass upwardly around the discharge ends of the return bends 9, and more or less of the flame will pass through the foraminous baffle plate 16.

Figure 3:
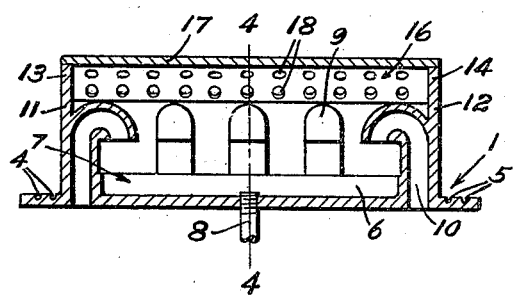
Fig. 3 is a vertical longitudinal central sectional detail of the oil burner, the view being taken on the lines 3—3 of Figs. 2 and 4, and on a plane parallel with Fig. 1 and showing a cook stove burner which is rectangular in plan.
Figure 4:
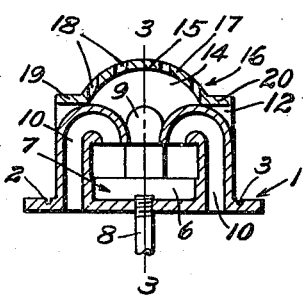
Fig. 4 is a vertical central cross section on the line 4—4 of Fig. 3, and on a plane parallel with Fig. 2.
Figure 5:
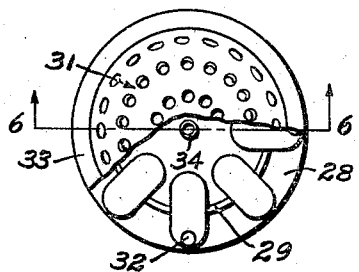
Fig. 5 is a top plan view looking in the direction indicated by the arrow 5 in Fig. 6, and showing a round burner suitable for use in a heating stove, water heater, or the like, parts being broken away to show the construction.
Figure 6:
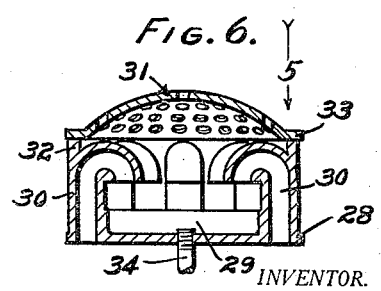
Fig. 6 is a vertical central sectional detail as on the line 6—6 of Fig. 5.

The principal essential difference between the rectangular burners, shown in Figs. 3 and 4, and the round burners, shown in Figs. 5 and 6, consists in making the base 28 circular in plan, and making the vaporizing pan 29 correspondingly circular and concentric to the edge of the base, arranging the return bend passages 30 in a circle around the vaporizing pan 29, and making the foraminous baffle plate 31 circular and providing posts 32 to support the rim 33 of the baffle plate. The oil feed pipe 34 leads to the center of the vaporizing pan 29, and the operation is the same as already described with reference to Figs. 1 to 4.

Various changes may be made without departing from the spirit of my invention as claimed.

I claim:

1. An oil burner comprising, a flat base, a continuous wall extending upwardly from the upper face of the base and forming a vaporizing pan, there being a pipe opening through the center of the base within the wall, and hollow return bends extending upwardly from the base through the wall and discharging into the vaporizing pan.

2. An oil burner comprising, a flat base; a continuous wall extending upwardly from the base and forming a vaporizing pan, there being a pipe opening through the center of the base within the wall; hollow return bends extending upwardly from the base through the wall and discharging downwardly into the vaporizing pan, the wall being higher than the return bends, and a foraminous baffle plate fitting upon the wall and covering the vaporizing pan and return bends.

In testimony whereof I have signed my name to this specification.

EDMUND C. SWISHER.

Copies of this patent may be obtained for five cents each, by addressing the "Commissioner of Patents, Washington, D. C."